United States Patent [19]

Minneman et al.

[11] Patent Number: 4,466,532

[45] Date of Patent: Aug. 21, 1984

[54] REPLACEABLE FINGER ELEMENTS FOR TRANSPORTING HOT GLASS ARTICLES

[75] Inventors: Lester C. Minneman, Maumee; Jack I. Perry, Sylvania, both of Ohio

[73] Assignee: Dura Temp Corporation, Holland, Ohio

[21] Appl. No.: 299,287

[22] Filed: Sep. 4, 1981

[51] Int. Cl.³ ............................................. B65G 25/00
[52] U.S. Cl. .................................... 198/490; 198/731; 198/741
[58] Field of Search ............... 198/731, 732, 741, 747, 198/648, 852, 712, 490, 733, 457; 65/374.1, 374.14, 374.15, 260; 428/450

[56] References Cited

U.S. PATENT DOCUMENTS

| | | | |
|---|---|---|---|
| 3,025,638 | 3/1962 | Krawetzke | 65/374.15 |
| 3,166,181 | 1/1965 | Rutkus et al. | 198/457 |
| 3,559,537 | 2/1971 | Faure | 198/490 |
| 3,701,407 | 10/1972 | Kulig | 198/457 |
| 3,779,362 | 12/1973 | Horn | 198/490 |
| 3,910,404 | 10/1975 | Henrekson | 198/852 |
| 4,382,998 | 5/1983 | Stengle | 428/450 |

Primary Examiner—Joseph E. Valenza
Assistant Examiner—Kyle E. Shane
Attorney, Agent, or Firm—E. J. Holler

[57] ABSTRACT

This invention relates to conveyor systems and more particularly to article handling or positioning mechanisms for serially conveying or transporting hot glass containers between two or more work stations and into precise locations on alignment. The systems utilize heat-resistant fingers or arms to provide spaced-apart modules for retaining the glass articles, the fingers or arms being readily replaceable and reversible in ready-releasing locking arrangement.

25 Claims, 24 Drawing Figures

FIG. 10
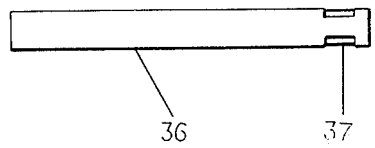
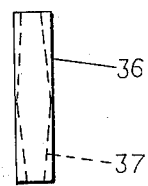
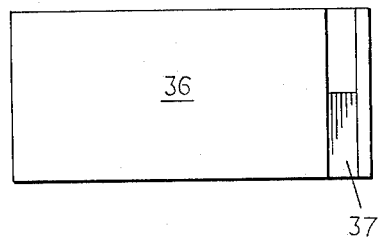
FIG. 11  FIG. 12
FIG. 13
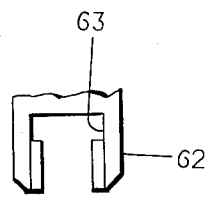
FIG. 14
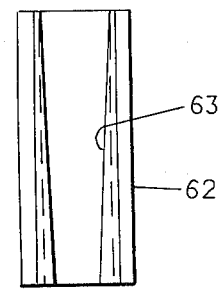

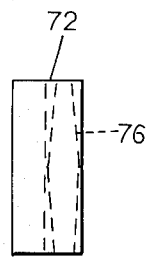
FIG. 20
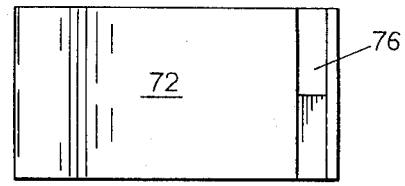
FIG. 21
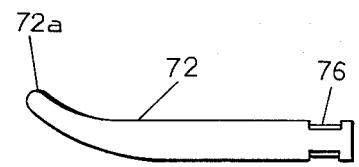
FIG. 19
FIG. 24
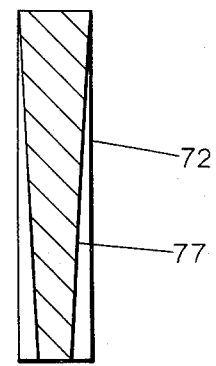

REPLACEABLE FINGER ELEMENTS FOR TRANSPORTING HOT GLASS ARTICLES

CROSS-REFERENCE TO RELATED APPLICATION

Related U.S. Pat. No. 4,382,998 issued May 10, 1983 is entitled "Heat-Resistant Molding Composition And Molded Parts For Handling Hot Glass Articles," Ser. No. 271,479 filed June 8, 1981 in the names of Edward J. Stengle and Lester C. Minneman, which patent is assigned to the same common assignee as the present application.

BACKGROUND OF THE INVENTION

This invention relates to conveyor systems and more particularly to article handling or positioning mechanisms for serially conveying or transporting hot glass articles between two or more work stations and into precise locations or alignment. Ordinarily, one type of such conveyor for transporting such articles involves one or more feed chains or belts having a plurality of spaced-apart transport fingers or arms thereon for engaging individual articles. Other types of such conveyors involve moving the articles either individually, or collectively as a group, from a stationary or moving surface by means of pusher bars or sweep-outs to another transport surface on which precise article location is a requisite.

Conveyor systems comprising stationary or moving transport surfaces with modules or pockets extending from one side of the conveyor transport surface are widely used for the conveyance of newly-formed articles or workpieces in the glass container manufacturing industry. It is common for newly-formed articles such as glass containers to be pushed along dead plates or transfer plates by ware contacting modules or pockets which move close to but normally out of contact with such transfer plates or surfaces. The pockets must be padded in most cases to avoid damaging the glassware or creating detrimental checks on their side surfaces which can have an adverse effect on the quality of such ware. The pockets must be heat-resistant to withstand the elevated temperatures of the glass articles for long-term continuous use without replacement. The pockets must be sufficiently strong to avoid breakage of their components, and ready replacement of article contacting members due to wear or damage must be anticipated. The transport mechanism must have sufficient strength to carry a plurality of modules wherein each module constitutes a finger holder and one or more individual fingers retained by the finger holder. It is highly desirable that removal and replacement of an individual finger be readily accomplished in repairing or replacing a damaged or worn module.

Conveyor systems where the present invention is especially applicable may be comprised of so-called curved-chain conveyors, sweep-out mechanisms and lehr-bar pusher mechanisms, all of which are normally located between the forming machine and the annealing lehr in the manufacture of glass containers. In each case in the high-speed production of high-quality glass containers, the containers must be handled with special care to avoid any deformation or surface marring or checking during their movement in plural groups or individually as required while possessing considerable residual heat of formation.

It is an object of the present invention to provide an improved component for various types of conveyor systems having replaceable heat-resistant fingers or arms especially adapted to transporting newly-formed hot glass articles without marring or checking the same. The systems normally have a series of spaced-apart modules for retaining a series of complementary-shaped fingers in positively locked but readily replaceable arrangement. Each of the holders has one or more tapered locking slots therein adapted to receive a heat-resistant solid lubricant-type finger or plate having a complemental tapered tongue therein. The fingers are formed from moldable thermoset fibrous-containing material adapted to wear and heat-resistant use under severe operating conditions.

It is especially desirable that the working components of each module be strongly secured to the bar or chain, or other operating mechanism, and that rugged connection permitting ready detachment and replacement, or reversibility of the working finger-like components be provided, while supporting each of the fingers in a suitable holder very rigidly upon the bar or chain or other mechanism.

A further object of this invention is to provide an improved conveyor system of the plural modular-pocket type having replaceable molded finger elements in their working areas. Another object is to provide markedly improved connecting means between the replaceable working elements or molded fingers of each module and the module moving mechanism. Obviously, other objects and advantages of the present invention will be apparent from the following detailed description.

BRIEF DESCRIPTION OF THE DRAWINGS

In the accompanying drawings, in which several embodiments of the present invention are shown:

FIG. 10 is an enlarged top plan view of an individual rectangular finger of the type as shown in FIGS. 1, 3 and 5 having a tapered recessed male tongue.

FIG. 11 is an end view of the individual finger shown in FIG. 10.

FIG. 12 is a side elevational view of the individual finger shown in FIGS. 10 and 11 showing a double tapered recessed male tongue portion.

FIG. 13 is a further enlarged fragmentary top plan view of the female retention slot portion of an individual finger holder member.

FIG. 14 is an end view of the individual finger member of FIG. 13 showing the female retention slot portion in vertical elevation.

FIG. 19 is an enlarged top plan view of an individual single finger with a curvilinear extremity.

FIG. 20 is an end view of the individual curved finger shown in FIG. 19.

FIG. 21 is a side elevational view of the individual curved finger shown in FIGS. 19 and 20.

FIG. 24 is an enlarged vertical sectional view similar to FIG. 18 of a finger member showing a single tapered recessed tongue portion.

DETAILED DESCRIPTION OF THE PREFERRED EMBODIMENT

Figure 2:
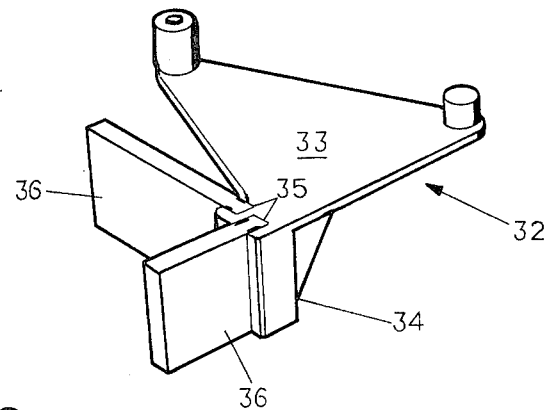
FIG. 2 is a perspective view of an individual link chain element for a curved flight conveyor which comprises a finger holder member for supporting a pair of fingers.
Figure 1:
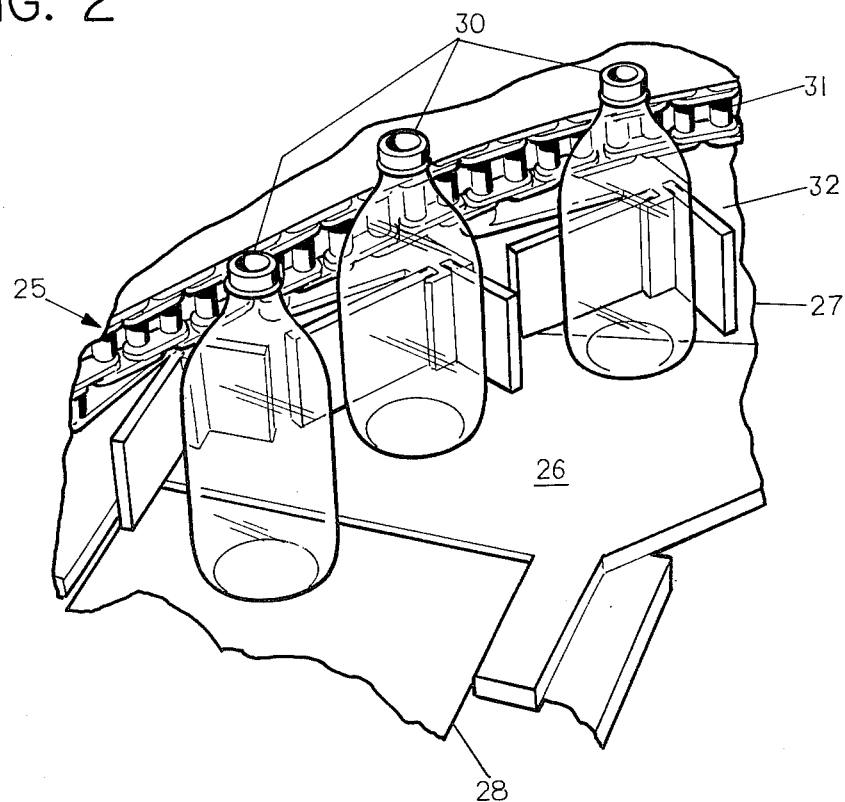
FIG. 1 is a fragmentary perspective view of a portion of a curved flight conveyor and its associated dead plate for conveying glass containers serially between conveyors.

FIGS. 1 and 2 illustrate one embodiment of the present invention. Referring initially to FIG. 1, it will be observed that a conveyor chain of a curved chain flight conveyor generally designated 25 is adapted to move through a curvilinear path over a transfer plate 26. Such chain is aligned to traverse the surface of the transfer plate and move articles over it in spaced-apart alignment between first and second conveyors 27 and 28 respectively. The articles are shown as newly-formed hollow glass containers 30 which are moved serially in equi-spaced alignment between the two conveyors which terminate at essentially a right angle. Transfer plate 26 is mounted in co-planar relation with and between the upper reaches of the two conveyors. The chain 31 of the curved chain system includes multiple sections of plain roller chain having universal connections with mountings in the form of special chain link elements for spaced-apart finger holders 32. The sections are made up of cooperating link elements, rollers and connecting pins as well known in the art. Such sections are disclosed in greater detail in U.S. Pat. No. 2,756,868 to Russell which illustrates one type of such conveyor chain and flight mounting arrangement.

The finger holder members 32 which are rigidly mounted to the chain link elements are illustrated in FIG. 2 for the curved chain conveyor system. Each finger holder member 32 has a flat plate portion 33 and a vertical extension portion 34, the latter portion having two similar tapered female slots 35 therein disposed at right angles and facing exteriorly in vertical relation. Each female slot 35 has a tapered configuration as shown in FIGS. 13 and 14 adapted to receive an individual rectangular finger member 36 having a complemental tapered recessed male tongue portion 37 as shown in FIGS. 10, 11 and 12. Each finger 36 is comprised of moldable thermoset heat-resistant material having a thickness of not less than about ¼ inch, and either a single or double tapered recessed male tongue or groove portion adjacent its mounting edge. The male tongue 37 has a width and tapered angle complemental to the slots 35 in the holder member 32. Each finger is comprised of a rigid solid-lubricant molded material preferably consisting of silicone resin, chopped glass fibers and graphite as set forth in greater detail in the aforementioned copending patent application Ser. No. 271,479 filed June 8, 1981. When one side becomes worn, the finger 43 may be moved to another slot in 90° relation placing the other side in working arrangement, or the finger may be inverted in the same slot.

Figure 4:
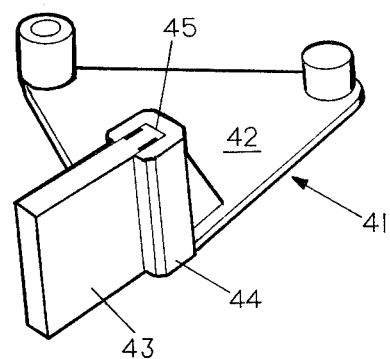
FIG. 4 is a view similar to FIG. 2 with the finger holder member supporting a single finger.
Figure 3:
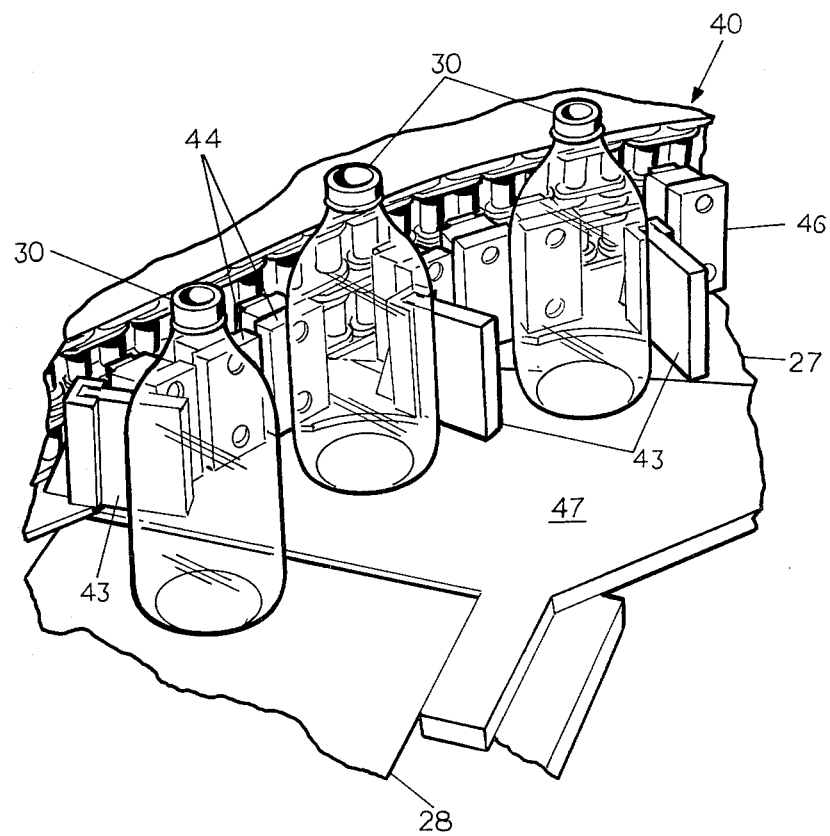
FIG. 3 is a view similar to FIG. 1 with each finger holder member supporting a single finger.
Figure 6:
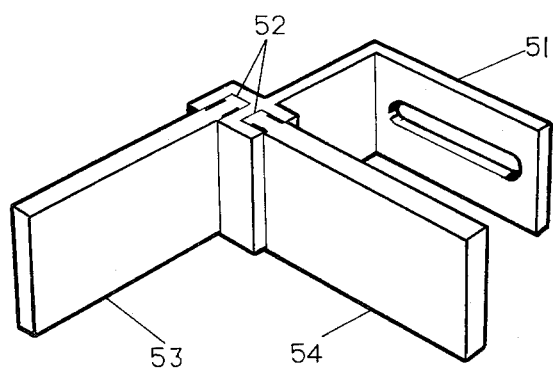
FIG. 6 is a view similar to FIGS. 2 and 4 with the individual finger holder member having a pair of fingers in right-angled relation.

FIG. 3 illustrates another type of curved chain flight conveyor mechanism 40 in which the holder members 41 of each flight or module carry an individual finger 43. FIG. 4 shows an individual holder element 41 with a flat plate portion 42 and a vertically extending portion 44 having a single vertical tapered female slot 45 therein for retaining a single finger 43. The curved chain carries a series of vertically-mounted blocks 46 of the same material as finger 43 and against which the articles such as glass containers 30 are transported. The fingers 43 and the blocks 45 carry the containers serially over transfer plate 47 between the two conveyors 27 and 28 disposed at right angles. With each of the fingers 43 having a double dovetail tapered female slot as shown in FIGS. 11 and 12, the fingers may be readily removed and reversed when worn to present the other side to the hot glass articles. Thus, each of the fingers due to their reversibility possesses longer useful life before required replacement being useful in several load-bearing directions. Thus, the fingers 36 may be mounted reversibly on either side of the holder member as desired.

Figure 5:
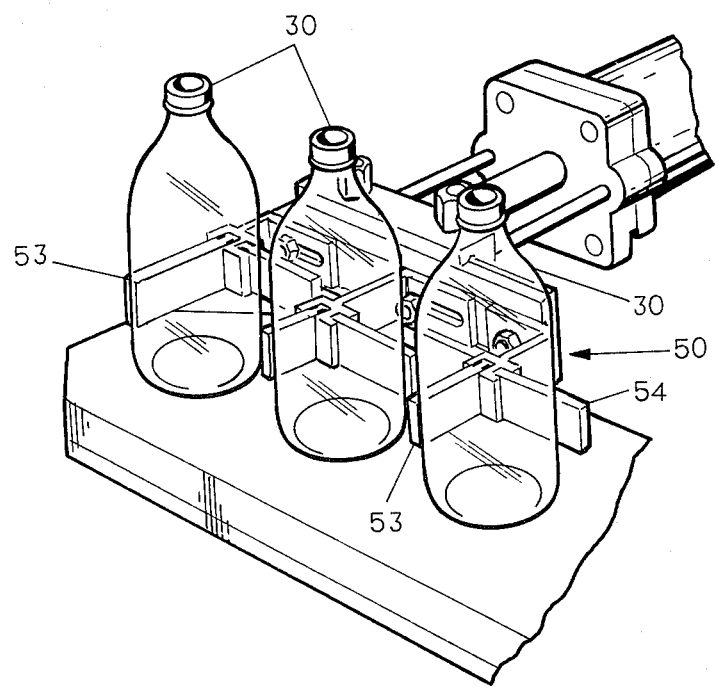
FIG. 5 is a view similar to FIGS. 1 and 3 of a glass container sweep-out mechanism with each finger holder member having a pair of fingers.

FIG. 5 illustrates a sweep-out mechanism 50 for a glass forming machine wherein a group of three glass containers 30 are transferred simultaneously from a dead plate to a flight conveyor immediately after forming. Each flight of the mechanism 50 is comprised of a holder member 51 which has a pair of tapered female slots 52 disposed in vertical right-angled relation. Rectangular rigid finger members 53 and 54 each have a complemental tapered recessed male tongues 37 near one edge mounted in each slot of holder member 51. The two fingers are aligned in right-angled relation. The containers 30 are each contacted by one flight with its two fingers 53 and 54 contacting the container sides at right-angled locations.

Figure 8:
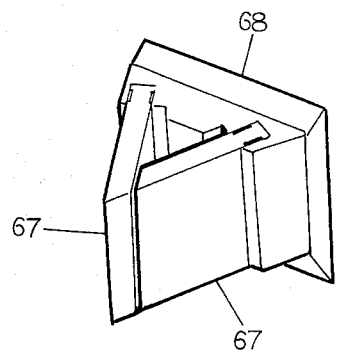
FIG. 8 is a view similar to FIGS. 2, 4, and 6 of an individual finger holder member having the pair of fingers in acute-angled arrangement.
Figure 9:
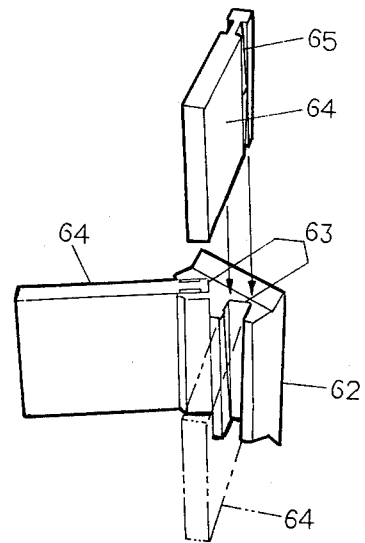
FIG. 9 is a view similar to FIG. 8 of another type of individual finger holder member for retaining a pair of fingers in obtuse-angled arrangement.
Figure 7:
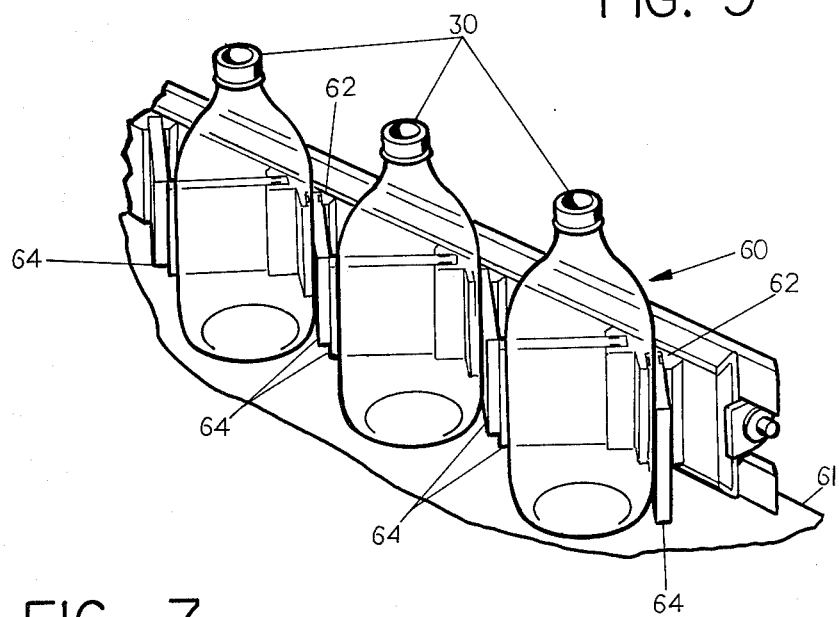
FIG. 7 is a view similar to FIG. 1 of a lehr pusher-bar for glass containers with each finger holder member having a pair of fingers mounted in a butterfly acute-angled arrangement.
Figure 15:
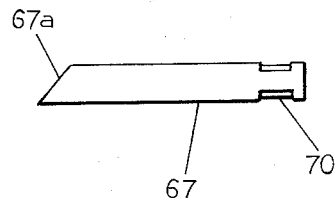
FIG. 15 is an enlarged top plan view of an individual rectangular finger having a beveled edge similar to the showing of FIG. 10.

FIG. 7 illustrates one type of lehr-bar 60 for pushing a group of glass containers 30 from a lehr loading conveyor 61 transversly onto a lehr matt (not shown) in precisely aligned arrangement. The lehr bar has a series of finger holder members 62 mounted thereon in vertical relation, each holder member having a pair of vertical tapered female slots 63 therein. Each tapered slot is adapted to receive finger member 64 having a complemental tapered recessed male tongue 65 therein. The fingers 64 are shown having square ends in FIGS. 7 and 9. The fingers 67 may also have beveled free-end extremities as shown in FIG. 8. The finger holder 68 has a pair of tapered female slots 69 located at an acute angle so that the beveled ends are disposed in close proximity. The fingers 67 having beveled ends are shown in detail in FIGS. 15, 16 and 17, with the opposite end having a double-tapered dovetailed male tongue 70. The beveled free end has an angle of about 50 degrees plus or minus 10 degrees as shown in FIG. 15. The double-tapered dovetailed male tongue portion is shown in greater detail in FIG. 18. The two fingers 67 mounted in equiangular relation in finger holder 68, as shown in FIG. 8, permit the beveled ends to meet at a prescribed angle of about 50 degrees. A pair of the holders each bearing two fingers, when mounted in closely adjacent relation on the lehr bar permit one container to be moved within the modular pocket therebetween. With a series of the holders 68 mounted in uniform spaced-apart alignment across the lehr bar, a group of glass containers can be simultaneously moved from conveyor 61 and into the lehr in precise locations when the lehr bar is moved transversely to the conveyor direction to intercept the containers. FIG. 8 shows the holder 68 with the two fingers comprising a pointed module which fits between containers. FIG. 9 shows an individual holder 62 as shown in series on the lehr bar in FIG. 7 wherein the two fingers 64 fit within a pair of vertical tapered female slots 63 disposed at an obtuse angle. Both types of holders 62 and 68 employ the same type of finger connecting means with the fingers having complementary widths and tapers in their recessed male tongues or grooves.

The tapered dovetail-type female slots in each of the holders are shown in greater detail in FIGS. 13 and 14. The slot 63 in holder 62 shown in FIG. 13 has a greater width within an inner region and gradually increasing downwardly taper ranging in included angle from about 1 to 16 degrees. A locking angle of about 7 degrees is preferred for positive slip-fit retention and ready removal of the finger member as desired.

Figure 16:
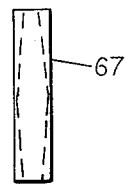
FIG. 16 is an end view of the individual finger shown in FIG. 15 showing a double tapered-recessed male tongue portion.
Figure 17:
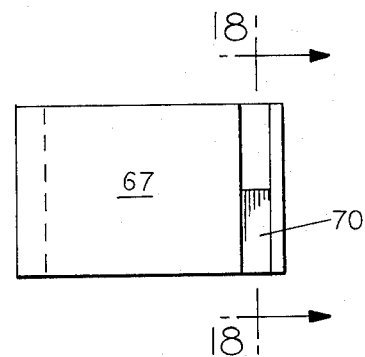
FIG. 17 is a side elevational view of the individual finger shown in FIGS. 15 and 16.

FIGS. 15, 16 and 17 show the beveled finger 67 illustrated in use on a lehr bar in FIGS. 7, 8 and 9. Each finger 67 has a tapered recessed tongue 70 which is similar on both sides of the finger having parallel working faces. The free end extremity 67a is beveled to permit its cooperative alignment with a like member in equi-angle relation. The beveled end facilitates use of each finger in several different angular positions for multiple use of the same finger.

Figure 22:
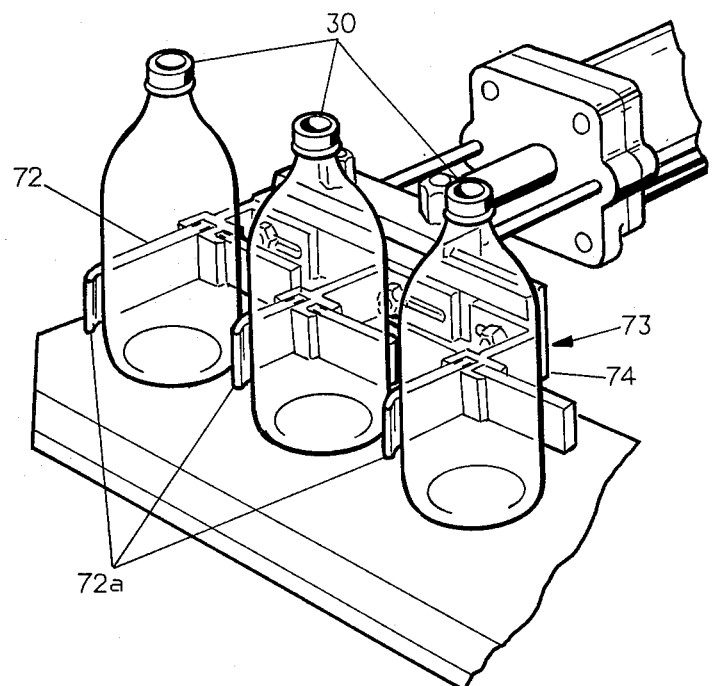
FIG. 22 is a fragmentary perspective view of a portion of a glass container sweep-out mechanism with each finger holder member having a pair of fingers, one of which has a curvilinear free-end.

FIG. 22 shows another type of finger member 72 in use on a sweep out mechanism designated by the numeral 73. The glass containers 30 are engaged as a group (three being shown) by a series of three similar finger holder members 74 mounted in co-planar relation. Each holder has a pair of vertical tapered female slots 75 adapted to receive two finger members 72 and 76. Finger 76 has a rectangular shape with smooth flat working surfaces while finger 72 has a rectangular shape with a curvilinear free end portion 76a. The curved free end counteracts centrifugal forces generated by rapid movement of the glass containers from dead plate to a take-out conveyor. The curved finger serves to neutralize such forces and maintain the containers in stable controlled relation during their movement.

FIG. 19 shows the finger 72 with the tapered recessed male tongue 76 as described hereinabove and with the curvilinear free end 72a. Tongue 76 comprises a double dovetail tapered groove having the same complemental shape as the female slot 75 in finger holder 74.

Figure 18:
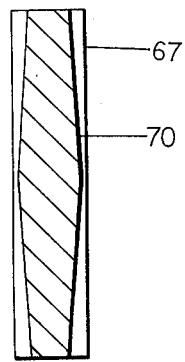
FIG. 18 is a further enlarged vertical sectional view taken along the line 18—18 of FIG. 17 of a finger member showing the double-tapered recessed tongue portion.
Figure 23:
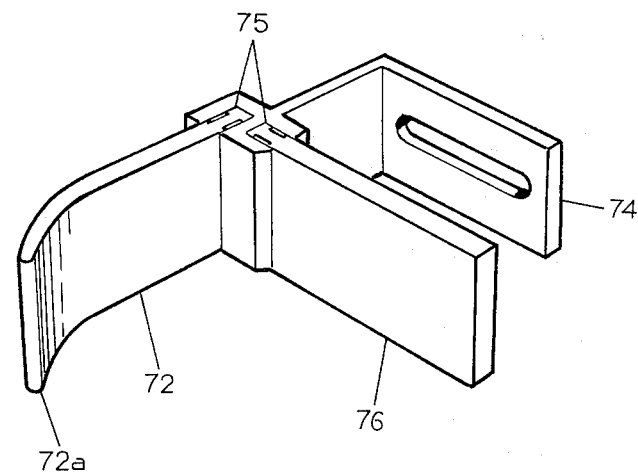
FIG. 23 is a perspective view of an individual finger holder member having a pair of fingers, one of which has a curvilinear extremity as shown in FIG. 22.

The tongue area of each finger 72 may have either a double dovetail tongue as shown in FIG. 18 with the two male tapers symmetrically disposed, or a single dovetail tongue 77 groove as shown in FIG. 24, both being shown in enlarged cross-section. The double dovetail groove permits inversion of the finger member for reversible use. Whether the groove be single or double, it has a width to length ratio of at least 1 to 1, and preferable a ratio of about 1 to 2½ for durable locking connection. The tapered female slot in the finger holder and the tapered recessed male tongue portion of the finger member have complemental included angles ranging from about 1 to 16 degrees for slip-fit readily-replaceable connection, a preferred range of included angle being from 6 to 10 degrees. The several grooves have complemental widths and most preferably an included angle of about 7 degrees to provide easy-releasing locking feature. The finger member has a thickness of not less than about ⅛ inch at the male tongue area with an overall thickness of less than about ½ inch and a height of about 4 inches.

The finger member is comprised of molded solid-lubricant thermoset material preferably a silicone casting resin, chopped glass fibers and graphite with minor amounts of amine catalyst, iron oxide pigment and calcium stearate lubricant, the latter being variable as required for the selected molding operation. The precise compositions for either compression or transfer molding of the finger members are set forth in U.S. Pat. No. 4,382,998 issued May 10, 1983, Application Ser. No. 271,479 filed June 8, 1981, assigned to the same common assignee as the present application.

Various modifications of the present invention may be resorted to within the spirit and scope of the appended claims.

We claim:

1. In a conveyor system for serially transporting and positioning newly-formed glass articles, the system having a plurality of article moving modules extending over the conveyor transport surface in spaced-apart array, the combination of each module comprising a finger holder having at least one tapered female slot therein disposed in generally vertical relation facing the said conveyor transport surface, and at least one rigid finger member consisting of molded solid-lubricant thermoset material having at least one complemental tapered recessed tongue adjacent a first linear edge for its slip-fit retention in cantilevered relation within said finger holder over or adjacent to said transport surface, said finger member having a double-tapered recessed male tongue extending in symmetry from opposing edges normal to said first linear edge to a medial region and with each side of said tongue being complemental to the tapered female slot in said finger holder for its reversible usage.

2. The combination in accordance with claim 1, wherein the said tapered female slot in said finger holder and the said tapered recessed male tongue in said finger member have complemental included angles ranging from about 1 to 16 degrees for slip-fit readily-replaceable connection.

3. The combination in accordance with claim 1, wherein the said tapered female slot in said finger holder and the said tapered recessed male tongue in said finger member have complemental widths and included angles of about 7 degrees.

4. The combination in accordance with claim 1, wherein the said finger member of each module has a thickness of not less than about ⅛ inch at the tapered recessed male tongue and generally parallel article-contacting surfaces adapted to handling hot glass articles without creating surface blemishes.

5. Th combination in accordance with claim 1, wherein the said finger member of each module is comprised of heat-resistant solid-lubricant material including silicone resin, chopped glass fibers and graphite in molded form.

6. The combination in accordance with claim 1, wherein the said finger member has a single tapered recessed male tongue complemental to the tapered female slot in said finger holder.

7. The combintion in accordance with claim 1, wherein the said finger member has a rectangular shape and parallel smooth working surfaces and a thickness of less than about ½ inch with the tapered recessed male tongue having a width to length ratio of about 1 to 2½.

8. The combination in accordance with claim 1, wherein the said finger member has a rectangular shape and a beveled edge at its extremity opposite the edge having the complemental tapered recessed male tongue.

9. The combination in accordance with claim 1, wherein the said finger member has a rectangular shape and a curvilinear edge contour at its extremity opposite the edge having the complemental tapered recessed male tongue.

10. The combination in accordance with claim 1, wherein the said complemental tapered recessed male tongue in said finger holder and the tapered female slot in said finger member extend vertically normal to the conveyor transport surface.

11. In a conveyor system for serially transporting and positioning newly-formed glass articles, the system having a plurality of article moving modules extending over the conveyor transport surface in spaced-apart array, the combination of each module comprising a finger holder having two tapered female slots therein disposed in generally vertical relation facing the said conveyor transport surface with at least one tapered female slot normal thereto, and a pair of rigid finger members consisting of molded solid lubricant thermoset material each having at least one complemental tapered recessed male tongue therein adjacent one lineal edge for its slip-fit retention in cantilevered relation within one of the tapered female slots in said finger holder over or adjacent to said conveyor transport surface, said pair of rigid finger members providing an angled pusher-pad module pocket for transporting an individual glass article into precisely-positioned location, said finger holder having two tapered female slots and each of the said finger members having a double tapered recessed male tongue in symmetry adjacent one edge thereof for their replaceable mounting in said finger holder in slip-fit vertical relation.

12. The combination in accordance with claim 11, wherein the said two tapered female slots in said finger holder and the tapered recessed male tongue in each of the said finger members have uniform complemental included angles ranging from about 1 to 16 degrees for load-bearing slip-fit readily-replaceable connection.

13. The combination in accordance with claim 11, wherein the said two tapered female slots in said finger holder and the tapered recessed male tongue in each of the said finger members have complemental widths and included angles of about 7 degrees.

14. The combination in accordance with claim 11, wherein the pair of rigid finger members of each module has a thickness of not less than about ⅛ inch at the recessed male tongue and generally parallel article contacting surfaces adapted to handling hot glass articles without creating surface blemishes.

15. The combination in accordance with claim 11, wherein the pair of said finger members of each module is comprised of heat-resistant solid-lubricant material including silicone resin, chopped glass fibers and graphite in molded form.

16. The combination in accordance with claim 11, wherein each of the said finger members has a double tapered recessed male tongue extending in lineal alignment in symmetry from opposing edges and adjacent a parallel edge with each half-portion of said tapered recessed male tongue being complemental to the tapered female slot in said finger holder for reversible usage of said finger members.

17. The combination in accordance with claim 11, wherein each of said finger members has a rectangular shape and parallel smooth working surfaces and a thickness of less than about ½ inch.

18. The combination in accordance with claim 11, wherein each of said finger members has a rectangular shape and a beveled edge at its extremity opposite the edge having the complemental tapered recessed male tongue.

19. The combination in accordance with claim 11, wherein at least one of said finger members has a rectangular shape and a cylindrical segmental shape at its extremity opposite the edge having the complemental tapered recessed male tongue.

20. The combination in accordance with claim 11, wherein the two tapered female slots in said finger holder and the complemental tapered recessed male tongue in each finger member have a width to length ratio of about 1 to 2½ and an included angle ranging from 1 to 16 degrees.

21. The combination in accordance with claim 11, wherein each of the tapered recessed male tongue portions have an included angle of about 7 degrees for locking engagement within the tapered female slots in said finger holder.

22. In a conveyor system for serially transporting and positioning newly-formed glass articles, the system having a plurality of article moving modules extending over the conveyor transport surface in equi-spaced array, the combination of each module comprising a finger holder having two tapered female locking slots therein disposed in generally vertical equi-angular relation facing the said conveyor transport surface, and a pair of rigid finger members consisting of molded solid-lubricant thermoset material each having at least one complemental tapered recessed male locking tongue therein adjacent one lineal edge for its slip-fit retention in cantilevered relation within the two tapered female locking slots in said finger holder, the said pair of rigid finger members having beveled free end portions disposed in adjacent relation over or near said conveyor transport surface, said pair of rigid finger members providing an equi-angled pusher-pad module pocket for transporting an individual glass article between modules into precisely-positioned location.

23. The combination in accordance with claim 22, wherein the two tapered female locking slots in said finger holder and the tapered recessed male locking tongue in each of said finger members have uniform complemental included angles ranging from about 1 to 16 degrees for load-bearing slip-fit readily-replaceable connection.

24. The combination in accordance with claim 22, wherein the two tapered female locking slots in said finger holder and the tapered recessed male locking tongue in each of said finger members have complemental widths and included angles of about 7 degrees.

25. The combination in accordance with claim 22, wherein the pair of finger members of each module is comprised of heat-resistant solid-lubricant thermoset material including silicone resin, chopped glass fibers and graphite in molded form.

* * * * *